(12) United States Patent
Hofmann et al.

(10) Patent No.: US 8,302,160 B2
(45) Date of Patent: Oct. 30, 2012

(54) PROPAGATION OF AUTHENTICATION DATA IN AN INTERMEDIARY SERVICE COMPONENT

(75) Inventors: Christoph H. Hofmann, Wiesloch (DE); Martijn De Boer, Heidelberg (DE)

(73) Assignee: SAP AG, Walldorf (DE)

( * ) Notice: Subject to any disclaimer, the term of this patent is extended or adjusted under 35 U.S.C. 154(b) by 1120 days.

(21) Appl. No.: 11/582,066

(22) Filed: Oct. 17, 2006

(65) Prior Publication Data
US 2008/0091949 A1  Apr. 17, 2008

(51) Int. Cl.
*G06F 7/04* (2006.01)
*G06F 15/16* (2006.01)
*G06F 17/30* (2006.01)
*H04L 29/06* (2006.01)

(52) U.S. Cl. .......... 726/3; 726/2; 726/4; 726/5; 726/10; 713/182; 713/183

(58) Field of Classification Search .......... 713/155–159, 713/168–174, 182–186, 202; 709/225, 229; 726/8, 2–5, 10, 26–27
See application file for complete search history.

(56) References Cited

U.S. PATENT DOCUMENTS

| 6,092,191 | A  | * | 7/2000  | Shimbo et al. ............. 713/153 |
| 6,148,404 | A  | * | 11/2000 | Yatsukawa ................. 726/2   |
| 6,243,466 | B1 | * | 6/2001  | Young et al. .............. 380/28  |
| 7,043,760 | B2 |   | 5/2006  | Holtzman et al.                     |
| 7,120,692 | B2 |   | 10/2006 | Hesselink et al.                    |
| 7,296,290 | B2 |   | 11/2007 | Barriga et al.                      |
| 7,526,799 | B2 | * | 4/2009  | Birk et al. ............... 726/9   |
| 2002/0087862 | A1 | * | 7/2002  | Jain et al. ............... 713/176 |
| 2003/0046551 | A1 | * | 3/2003  | Brennan ................... 713/185 |
| 2003/0163733 | A1 |   | 8/2003  | Barriga-Caceres et al.              |
| 2004/0059942 | A1 |   | 3/2004  | Xie                                  |
| 2004/0133499 | A1 | * | 7/2004  | Mitreuter et al. ........ 705/37    |
| 2004/0181665 | A1 | * | 9/2004  | Houser .................... 713/158 |
| 2005/0235153 | A1 | * | 10/2005 | Ikeda ...................... 713/176 |
| 2005/0278528 | A1 |   | 12/2005 | Kathan                               |
| 2007/0113089 | A1 |   | 5/2007  | Yami et al.                          |
| 2007/0248050 | A1 |   | 10/2007 | Metke et al.                         |
| 2008/0091948 | A1 | * | 4/2008  | Hofmann et al. ........ 713/176     |
| 2008/0091950 | A1 | * | 4/2008  | Hofmann et al. ........ 713/176     |

OTHER PUBLICATIONS

IBM Corporation, J2EE Application Security, http://publib.boulder.ibm.com/infocenter/ieduasst/v1r1m0/index.jsp?topic=/com.ibm.iea.was_v6/was/6.0.1/Security/WASv601_Sec_J2EE_Security/player.html (http link on Dec. 4, 2009).*

"Non-Final Office Action" mailed Dec. 16, 2009, for U.S. Appl. No. 11/582,036, entitled "Propagation of Principal Authentication Data in a Mediated Communication Scenario", filed Oct. 17, 2006, 16pgs.

"Final Office Action" mailed May 26, 2010, for U.S. Appl. No. 11/582,036, entitled "Propagation of Authentication Data in a Mediated Communication Scenario" filed Oct. 17, 2006,12pgs.

(Continued)

*Primary Examiner* — Eleni Shiferaw
*Assistant Examiner* — Jing Sims
(74) *Attorney, Agent, or Firm* — Buckley, Maschoff & Talwalkar LLC (57) ABSTRACT

A system may include a sender computing system, an intermediary service component, and a receiver computing system. The sender computing system may transmit a message and authentication data, and the intermediary service component may receive the message and the authentication data from the sender computing system, process the message, and transmit the authentication data and the processed message. The receiver computing system may receive the authentication data and the processed message.

17 Claims, 6 Drawing Sheets

OTHER PUBLICATIONS

"Non-Final Office Action" mailed Mar. 31, 2010, for U.S. Appl. No. 11/582,105, entitled "System and Method to send a Message Using Multiple Authentication Mechanisms" filed Oct. 17, 2006,13pgs.

"Final Office Action" mailed Aug. 12, 2010, for U.S. Appl. No. 11/582,105, entitled "System and Method to send a Message Using Multiple Authentication Mechanisms" filed Oct. 17, 2006,14pgs.

"Non-Final Office Action" mailed Jun. 27, 2011, for U.S. Appl. No. 11/582,036, entitled "Propagation of Principal Authentication Data in a Mediated Communication Scenario", filed Oct. 17, 2006, 15pgs.

"Final Office Action" mailed Dec. 9, 2011, for U.S. Appl. No. 11/582,036, entitled "Propagation of Principal Authentication Data in a Mediated Communication Scenario", filed Oct. 17, 2006, 15pgs.

* cited by examiner

PROPAGATION OF AUTHENTICATION DATA IN AN INTERMEDIARY SERVICE COMPONENT

FIELD

Some embodiments relate to propagation of authentication data within a message service component disposed between a sender computing system and a receiver computing system. In particular, some embodiments concern reception of authentication data and a message from the sender computing system, processing of the message, and secure propagation of the authentication data and the processed message to the receiver computing system.

BACKGROUND

During a login process, authentication data (e.g., a principal name and data establishing the principal's identity) is received and an authentication action is performed based on the authentication data. An attacker may interrupt the login process to change the authentication data prior to performance of the authentication action. The authentication action may be defined as an atomic action in order to guard against this and other potential attacks. As an additional precaution, the authentication data may be discarded immediately after the authentication action is completed.

A consumer system may be required to login to a second system in order to obtain a service provided by a provider system. The consumer system therefore provides authentication data to the second (i.e. intermediary) system. The second system cannot discard the authentication data after performing an authentication action as described above, but instead must use the received authentication data to log into the provider system. However, the authentication data may be vulnerable to corruption and/or attack as it flows through the second system on its way to the provider system.

Systems are therefore desired for efficiently propagating authentication data from a consumer system to a provider system through an intermediary service component. Such systems may provide improved security of the authentication data in comparison to conventional systems.

DETAILED DESCRIPTION

Figure 1:
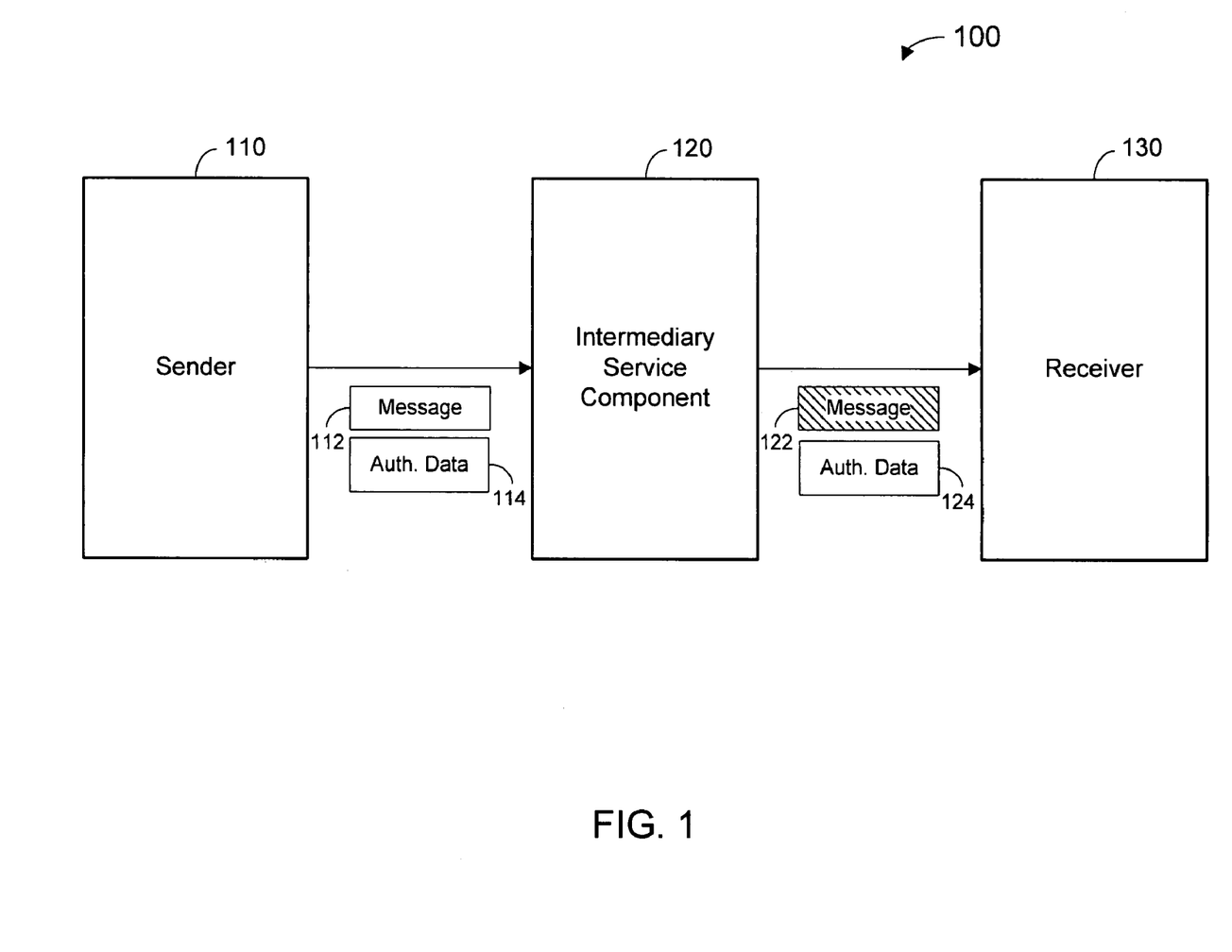
FIG. 1 is a functional block diagram of a communication system according to some embodiments.

FIG. 1 is a block diagram of system 100 according to some embodiments. System 100 illustrates a communication scenario in which intermediary service component 120 provides mediated communication between sender 110 and receiver 130. Other topologies may be used in conjunction with other embodiments.

Two or more of the elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other.

According to some embodiments, sender 110 may comprise a sender application that requires a service from receiver 130, which in turn comprises a receiver application. Sender 110 transmits message 112 and authentication data 114 to intermediary service component 120 as shown. Authentication data 114 may be separate from or included within message 112 according to some embodiments. Intermediary service component 120 receives message 112 and authentication data 114, processes message 112, and transmits processed message 122 and authentication data 124 to receiver 130.

Intermediary service component 120 may process message 112 in order to provide messaging-related services to sender 110 and receiver 130. Such services may include message processing at the transport level, message processing at the message level, and/or any other desired message processing. In some embodiments, intermediary service component 120 provides dynamic routing of messages received from sender 110 and/or mapping of message contents based on different message formats supported by sender 110 and receiver 130.

Authentication data 114 may identify a principal user under whom sender 110 is executing. Authentication data 114 may therefore be used to provide the principal user with access to services of receiver 130. Authentication data 114 may comprise any data based on which receiver 130 may perform an authentication action.

Non-exhaustive examples of authentication data 114 include a username/password (e.g., basic mode or digest mode), a signature and associated X.509 certificate, and a signed assertion (e.g., an SAP® logon ticket, a Security Assertion Markup Language assertion). Authentication data 114 may also or alternatively comprise any other currently- or hereafter-known types of authentication data. Authentication data 114 may identify an actual user such as the aforementioned principal user of sender 110 or a fixed anonymous user. Moreover, authentication data 114 may be transmitted on the transport level (e.g., sent via Hypertext Transfer Protocol communication mechanisms), the message level (e.g., within Simple Object Access Protocol message 112), or in any other suitable manner.

According to some embodiments, sender 110 and/or receiver 130 comprises an Advanced Business Application Programming® (ABAP) business system that employs ABAP proxies to communicate with component 120 via a protocol native to component 120. In other embodiments, sender 110 and/or receiver 130 comprises a Java™ proxy executed by an SAP Adapter Engine™ to transmit/receive messages via the native protocol. Sender 110 and/or receiver 130 may also or alternatively transmit/receive messages via such an Adapter Engine using a protocol that is not native to intermediary service component 120, in which case the Adapter Engine may exchange the message with component 120 using the native protocol. Sender 110 and/or receiver 130 may comprise another intermediary component which communicates with component 120 via the native protocol according to some embodiments. Each Adapter Engine and/or additional intermediary component requires a separate login and therefore must receive appropriate authentication data along with the propagated authentication data.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
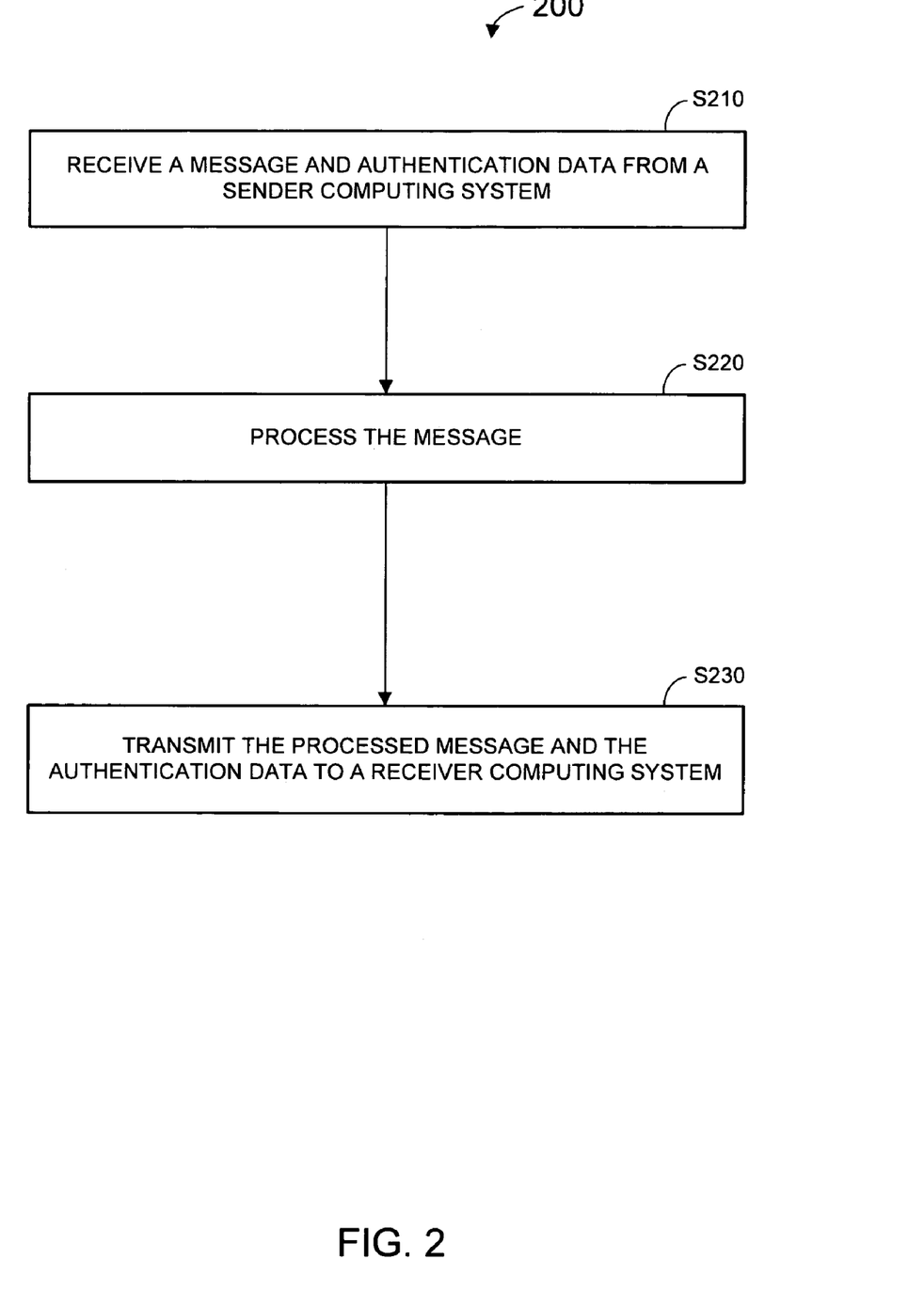
FIG. 2 is a flow diagram of a process according to some embodiments.

FIG. 2 is a flow diagram of process 200 according to some embodiments. Some embodiments of process 200 may provide propagation of authentication data in an intermediary service component. In some embodiments, intermediary service component 120 executes program code to perform process 200.

Process 200 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a message and authentication data are received from a sender computing system. In this regard, the sender computing system may execute an application that requires a service of a receiver computing system. The sender computing system may execute the application under a principal user associated with the authentication data and the application may transmit the message and authentication data prior to S210.

The message may be formatted according to any message format that is or becomes known, and may be received via any transport protocol that is or becomes known. The authentication data may be included within the message or may be separate from the message. The message and the authentication data need not be received simultaneously according to some embodiments of S210. However, the message and the authentication data are associated with one another in an identifiable manner (e.g., a unique reference number).

The message is processed at S220. The message may be processed in any desired manner. According to some embodiments, a transport level protocol of the received message is changed to a different transport level protocol. The processed message and the authentication data are transmitted at S230 to a receiver computing system. As mentioned above, the authentication data may be associated with a principal user under which an application is executed by the sender computing system. The authentication data transmitted at S230 need not be identical to the authentication data received at S210, as illustrated in FIG. 1 (i.e., authentication data 114 and authentication data 124).

Figure 3:
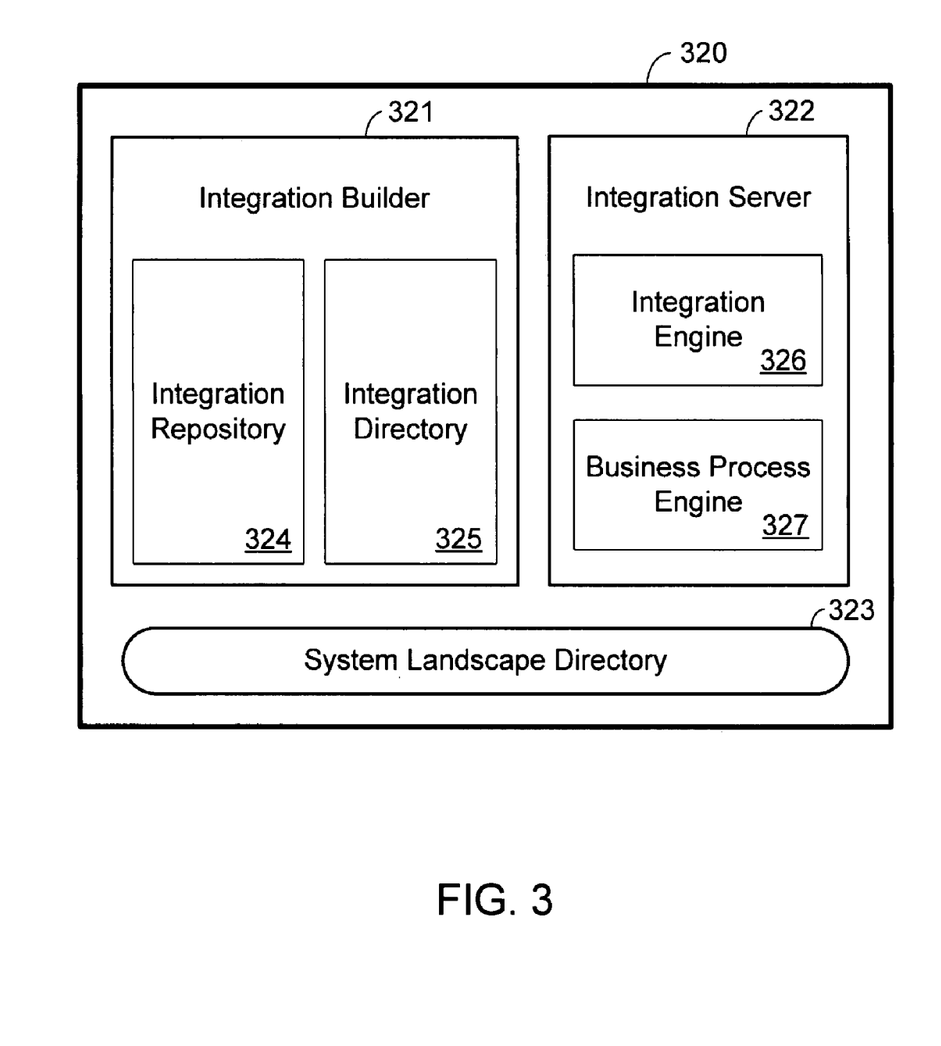
FIG. 3 is a block diagram of an intermediary service component according to some embodiments.

FIG. 3 is a functional block diagram of intermediary service component 320 according to some embodiments. Intermediary service component 320 may comprise an implementation of intermediary service component 120 of FIG. 1. In some embodiments, intermediary service component 320 implements the SAP Exchange Infrastructure™.

Intermediary service component 320 includes integration builder 321, integration server 322 and system landscape directory 323. Integration builder 321 allows editing of data relevant to interapplication communication. This data is stored in integration repository 324 and integration directory 325.

Integration repository 324 includes information documenting a logical collaborative process and required interfaces. More particularly, integration repository 324 may include integration scenarios to describe communication between applications, and integration processes to be executed by integration server 322. Integration repository 324 may also define structure or value mappings between messages that may be exchanged using disparate interfaces, context objects to mask elements or attributes in a message payload, and types to describe the structure of messages to be exchanged using message interfaces. System landscape directory 323 may define a subset of possibly relevant software components that may be used to limit the amount of information stored in integration repository 324.

Integration directory 325 includes information for configuring the logical collaborative process of integration repository 324 to a particular system landscape. This information may define conditions for message flow and design objects. System landscape directory 323 defines the particular system landscape to which integration directory 325 configures the collaborative process.

Integration server 322 is a distribution engine for interapplication messages at runtime, and integration engine 326 is the central runtime component of integration server 322. During runtime, integration engine 326 may use integration directory 325 to determine a receiver of an inbound message, to determine an interface to be used in transmitting the message to the receiver, to determine whether the inbound message must be mapped based on the determined receiver, to call any required mapping program, and to transmit the thus-processed message. Business process engine 327 may execute integration processes by communicating with integration engine 326 to execute mappings and to send and receive messages.

Figure 4:
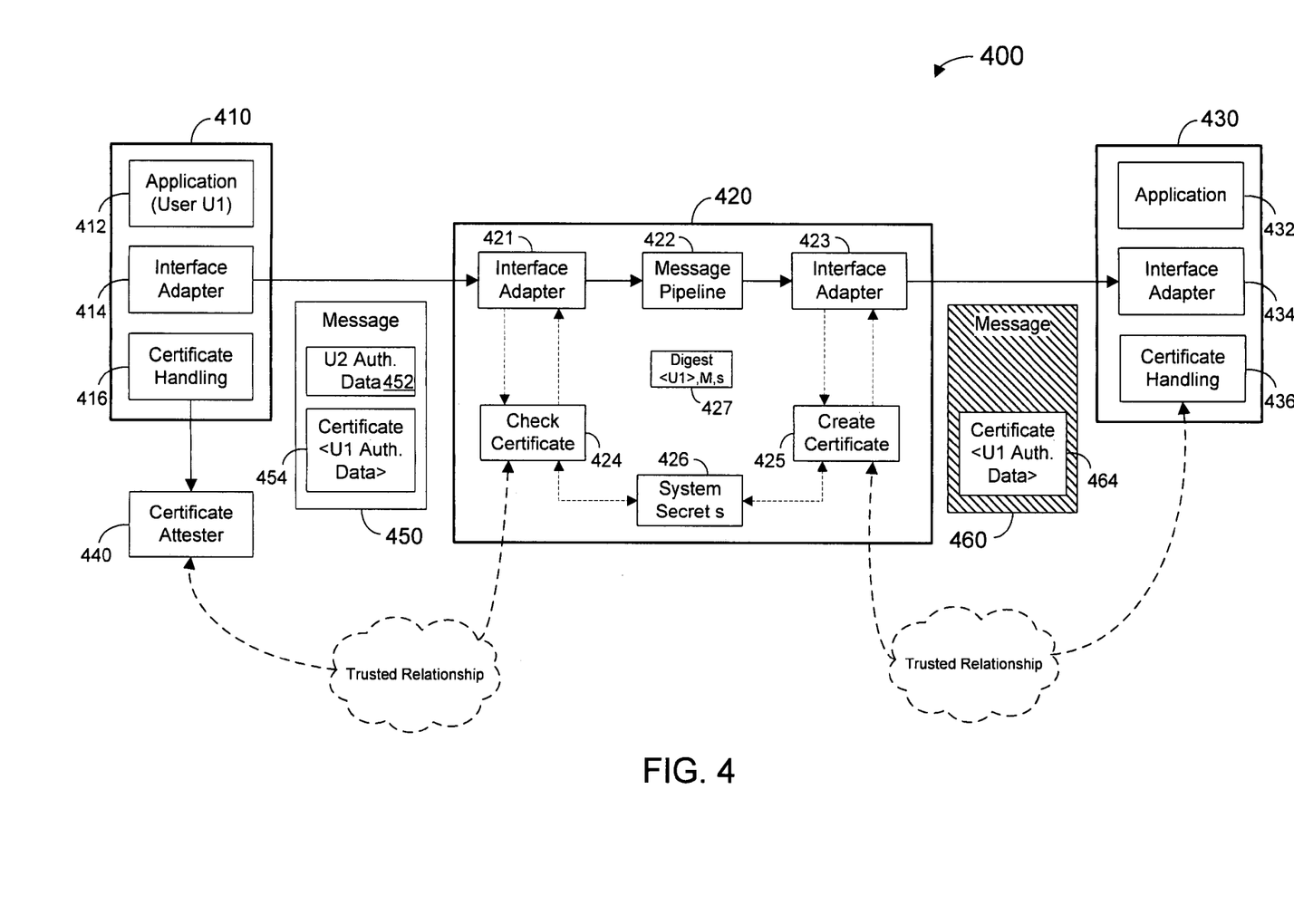
FIG. 4 is a block diagram of a system to propagate authentication data in an intermediary service component according to some embodiments.

FIG. 4 is a detailed block diagram of system 400 according to some embodiments. System 400 may comprise an implementation of system 100 of FIG. 1. Accordingly, component 420 of system 400 may execute process 200 in some embodiments.

System 400 includes sender computing system 410, intermediary service component 420 and receiver computing system 430. The foregoing elements may operate as described above with respect to respective elements 110, 120 and 130. A detailed operation of system 400 according to some embodiments will be described below with respect to FIGS. 5A and 5B.

Sender computing system 410 includes application 412, interface adapter 414 and certificate handling 416. Application 412 may comprise an application desiring service from receiver computing system 430, and interface adapter 414 may provide communication via a protocol that is supported by intermediary service component 420. Certificate handling 416 may operate in conjunction with certificate attester 440 to provide system 410 with the ability to secure messages using digital signatures and attester certificates. System 410 may comprise any system capable of executing program code. In this regard, the illustrated elements of system 410 may represent program code providing the particular functions described above.

As shown, interface adapter 414 may transmit message 450 to intermediary service component 420. Authentication data 452 is attached to or otherwise included within message 450. Authentication data 452 may be associated with an actual or fixed anonymous user (U2) known to component 420. Message 450 also includes assertion 454, which includes an attester's signature of entire message 450 (i.e., including assertion 454), a certificate of the attester, and authentication data. The authentication data of assertion 454 is associated with principal user U1, under whom application 412 is executed.

Interface adapter 421 of intermediary service component 420 is to receive message 450 from system 410, message pipeline 422 is to apply any required processing to message 450, and interface adapter 423 is to transmit processed message 460 to receiver computing system 430. Intermediary service component 420 may be implemented by an integration server such as integration server 320 of FIG. 3.

Intermediary service component 420 also includes check certificate block 424 and create certificate block 425. Generally, block 424 performs an authentication action based on received assertion 454 and generates digest 427 based on system secret s 426. The authentication action may comprise a validity check of assertion 454 that evaluates the attester's signature and the trustworthiness of the attester certificate based on a trusted relationship with the attester. Digest 427 associates the authentication data of assertion 454 with message 450 and with system secret s 426. Since the authentication data of assertion 454 is not used for authentication in component 420, the corresponding principal user need not be maintained or otherwise known to component 420.

Block 425 checks digest 427 against system secret s 426 and creates a second assertion 464 including the authentication data associated with the principal user U1, a second attester's signature of message 460 (including second assertion 464), and a second attester certificate. The authentication data associated with principal user U1 that was received from system 410 may be mapped to other authentication data associated with principal user U1 for inclusion into second assertion 464 according to some embodiments.

Second assertion 464 is included in message 460 prior to transmission to system 430, thereby re-authenticating principal user U1. Message 460 may include additional authentication data in a case that an intermediary component implementing a protocol similar to component 420 is disposed between component 420 and receiver 430.

Receiver computing system 430 includes application 432, interface adapter 434 and certificate handling 436. Application 432 may be capable of providing the service required by application 412 of sender computing system 410, and interface adapter 434 may support communication with interface adapter 423 of intermediary service component 420. Certificate handling 436 may perform an authentication action based on second assertion 464 and on a trusted relationship with block 425. If the action is successful, the authentication data associated with principal user U1 may be used to login to receiver 430 and to execute application 432 under principal user U1 so as to provide the requested service.

Figure 5A:
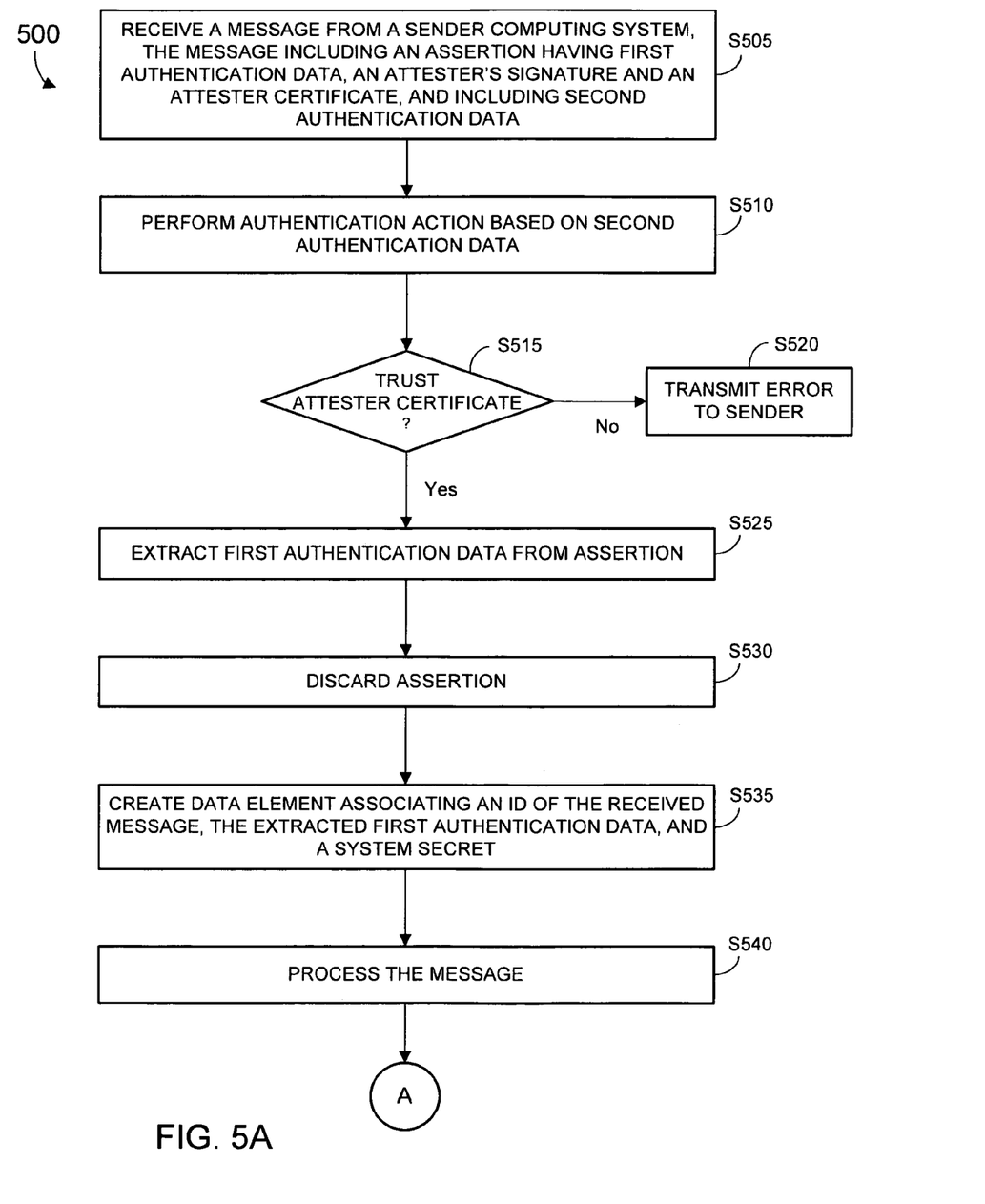
FIGS. 5A and 5B comprise a flow diagram of a process executed by the FIG. 4 system according to some embodiments.
Figure 5B:
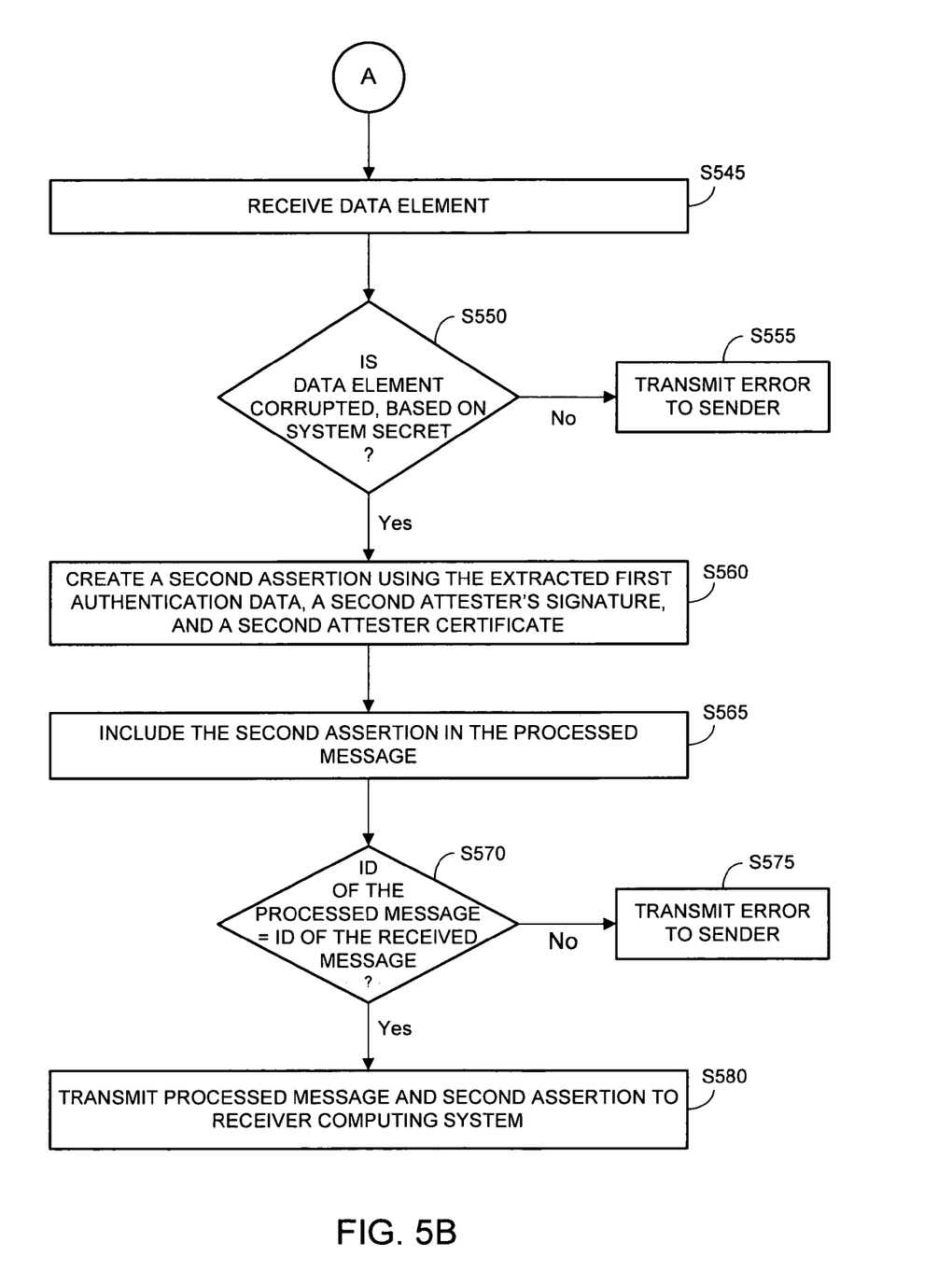

FIGS. 5A and 5B comprise is a flow diagram of process 500 according to some embodiments. Some embodiments of process 500 may provide propagation of authentication data in an intermediary service component. In some embodiments, intermediary service component 420 of FIG. 4 executes program code to perform process 500.

According to process 500, a message is received from a sender computing system at S505. The message includes an assertion and second authentication data. The assertion, in turn, includes first authentication data associated with principal user U1, an attester's signature of the message (including the assertion), and an attester certificate. The signature is intended o securely bind the first authentication data to the message. With reference to the example illustrated in FIG. 4, interface adapter 421 of intermediary service component 420 may receive message 450 from interface adapter 414 at S505.

More specifically, application 412, executing under user U1, may use interface adapter 414 to generate a proxy object of executable interfaces for communicating with component 420. The proxy object may create message 450 including authentication data 452 associated with an actual or fixed anonymous user (U2) known to component 420 and to sender 410. The proxy object may also interact with certificate handling 416 to obtain a certificate from certificate attester 410 and to include assertion 454 in message 450. As described above, assertion 454 includes an attester signature, an attester certificate, and authentication data associated with principal user U1. According to some embodiments, the proxy object and interface adapter 414 also operate to transmit message 450 via the Web Services protocol.

Next, at S510, an authentication action is performed based on the second authentication data. The authentication action may be performed using any authentication mechanism that is associated with the received second authentication data. For example, in a case that the second authentication data (e.g., U2 authentication data) comprises a username/password, the authentication action performed at S510 may comprise checking the username/password against stored authentication data.

If the authentication action is successful, the attester signature and the attester certificate of the assertion are checked at S515. Block 424 of the FIG. 4 system may perform the check at S515. The check may include checking the validity of the signature and identifying that the attester certificate was issued by a trusted certificate attester. The determination at S515 is affirmative in the present example because a trusted relationship exists between block 424 and certificate attester 440. If the determination is negative, an error is transmitted to sender 410 at S520.

The first authentication data is extracted from the assertion at S525. This extraction may also be performed by block 424 of component 420. The assertion may then be discarded at S530 for security purposes. Next, a data element is created at S535. The data element may associate an invariant element of the received message (e.g., a message ID) with the extracted first authentication data and with a system secret.

According to the present example, block 424 creates digest 427 at S535 based on the aforementioned three inputs. Digest creation is known in the art, and results in a data "thumbprint" reflecting the data used to create the digest and which can be used to unambiguously prove a linkage between the first authentication data and the received message. System secret s 426 may comprise any suitable secret data accessible to block 424 and block 425. Since purposeful attacks or debugging during message processing may change execution variables, S515 through S535 are configured as atomic and inseparable kernel operations in some embodiments.

The received message is processed at S540. The message may be processed in any manner, including but not limited to those described above. In some embodiments of S540, message pipeline 422 may map the message based on receiver 430 and/or may execute integration processes on message 450 to generate a processed message. Digest 427 is maintained by component 420 throughout this message processing according to some embodiments.

The data element is then received at S545. Block 425 may receive digest 427 at S545 and may determine at S550 if digest 427 has been corrupted in view of system secret s 426. For example, block 425 may receive digest 427 and then, using system secret s 426, determine a new digest based on the first authentication data and the message ID. If the new digest does not match digest. 427, an error is transmitted to sender computing system 410 at S555. If the digests match, flow proceeds to S560.

A second assertion is created at S560 using the first authentication data, a second attester signature of the processed message to be transmitted (including the second assertion), and a second attester certificate. Create certificate block 425 may therefore, in some embodiments, act as an attester by creating the second attester signature and the second attester certificate in addition to creating the second assertion. The authentication data associated with principal user U1 that was received from system 410 may be mapped to other authentication data associated with principal user U1 for inclusion into the second assertion. Again, for security purposes, S550 through S560 may be implemented as atomic and inseparable kernel operations.

The second assertion is included in the processed message at S565, and it is determined at S570 whether the ID of the processed message is identical to the ID reflected in digest 428. The ID reflected in digest 428 is associated with the originally-received message and remains unchanged during message processing. Accordingly, checking the message ID at S570 ensures that the assertion (and, in particular, the first authentication data) is associated with the correct message.

An error is returned to sender 410 at S575 if the determination at S570 is negative. If the determination is positive, the processed message and the second assertion are transmitted to a receiver computing system at S580. With reference to FIG. 4, processed message 460 including second assertion 464 is transmitted to receiver 430 at S580.

According to some embodiments, interface adapter 434 receives message 460 from interface adapter 423 of intermediary service component 420 and certificate handling 436 performs an authentication action based on second assertion 464 and on a trusted relationship with block 425. After successful authentication, the authentication data associated with principal user U1 may be used to login to receiver 430 and to execute application 432 under principal user U1.

The embodiments described herein are solely for the purpose of illustration. Those skilled in the art will recognize other embodiments may be practiced with modifications and alterations limited only by the claims.

What is claimed is:

1. A method comprising:
receiving, by an intermediary service component, a message from a sender computing system, the message comprising:
an assertion including first authentication data, an attester signature of the message, and an attester certificate, the attester signature being a digital signature of a first attester; and
second authentication data;
creating, by the intermediary service component, a first digest based at least on an identifier of the message, the first authentication data, and a system secret;
after the creating of the first digest, processing, by the intermediary service component, the message;
after the processing the message, creating, by the intermediary service component, a new digest based at least on the identifier of the message, the first authentication data, and the system secret;
determining, by the intermediary service component, whether the first digest conforms to the new digest;
if it is determined that the first digest conforms to the new digest, creating, by the intermediary service component, a second assertion including the first authentication data, a second attester signature of the processed message and a second attester certificate, the second attester signature being a digital signature of a second attester different than the first attester;
transmitting, by the intermediary service component, the second assertion and the processed message to a receiver computing system;
prior to the processing the message, performing an authentication action based on the second authentication data, determining whether the attester's signature is valid, and determining whether the attester certificate is trusted.

2. A method according to claim 1, further comprising: performing an authentication action based on the second authentication data; determining whether the attester signature is valid; and determining whether the attester certificate is trusted.

3. A method according to claim 2, wherein the creating, by the intermediary service component, a first data element associating an identifier of the message, the first authentication data, and a system secret comprises:
after the performing the authentication action based on the second authentication data, creating, by the intermediary service component, a first data element associating an identifier of the message, the first authentication data, and a system secret.

4. A method according to claim 3, wherein the creating, by the intermediary service component, a first data element associating an identifier of the message, the first authentication data, and a system secret comprises:
after the determining whether the attester signature is valid, creating, by the intermediary service component, a first data element associating an identifier of the message, the first authentication data, and a system secret.

5. A method according to claim 4, wherein the creating, by the intermediary service component, a first data element associating an identifier of the message, the first authentication data, and a system secret comprises:
after the determining whether the attester certificate is trusted, creating, by the intermediary service component, a first data element associating an identifier of the message, the first authentication data, and a system secret.

6. A method according to claim 5, wherein the transmitting, by the intermediary service component, the second assertion and the processed message to a receiver computing system comprises:
transmitting, by the intermediary service component, the second assertion and the processed message to a receiver computing system configured to perform an authentication action based on the first authentication data included in the second assertion created by the intermediary service component.

7. A method according to claim 3, wherein the transmitting, by the intermediary service component, the second assertion and the processed message to a receiver computing system comprises:
transmitting, by the intermediary service component, the second assertion and the processed message to a receiver computing system configured to perform an authentication action based on the first authentication data included in the second assertion created by the intermediary service component.

8. A method according to claim 1, wherein the first digest can be used to unambiguously prove a linkage between the first authentication data and the received message.

9. A method according to claim 1, wherein the determining, by the intermediary service component, whether the first digest conforms to the new digest comprises determining, by the intermediary component, whether the first digest matches the new digest.

10. A non-transitory medium storing processor-executable program code, the program code comprising:

code to receive, by an intermediary service component, a message from a sender computing system, the message comprising:

an assertion including first authentication data, an attester signature of the message, and an attester certificate, the attester signature being a digital signature of a first attester; and         second authentication data;

code to create, by the intermediary service component, a first digest based at least on an identifier of the message, the first authentication data, and a system secret;

code to process the message after the creation of the first digest;

code to, after the processing of the message, create, by the intermediary service component, a new digest based at least on the identifier of the message, the first authentication data, and the system secret;

code to determine whether the first digest conforms to the new digest;

code to create, if it is determined that the first digest conforms to the new digest, a second assertion including the first authentication data, a second attester signature of the processed message and a second attester certificate, the second attester signature being a digital signature of a second attester different than the first attester;

code to transmit the second assertion and the processed message to a receiver computing system; and     code to, prior to the processing of the message, perform an authentication action based on the second authentication data, determine whether the attester signature is valid and determine whether the attester certificate is trusted.

11. A non-transitory medium according to claim 10, wherein the first digest can be used to unambiguously prove a linkage between the first authentication data and the received message.

12. A non-transitory medium according to claim 10, the program code further comprising:

code to perform, prior to processing of the message, an authentication action based on the second authentication data;

code to determine, prior to processing the message, whether the attester signature is valid; and     code to determine, prior to processing the message, whether the attester certificate is trusted.

13. A non-transitory medium according to claim 10, Claim wherein the code to determine whether the first digest conforms to the new digest comprises code to determine whether the first digest matches the new digest.

14. A system comprising:

a sender computing system to transmit a message, the sender computing system including a memory to store program code, the message comprising:

an assertion including first authentication data, an attester signature of the message, and an attester certificate, the attester signature being a digital signature of a first attester; and     second authentication data;

an intermediary service component including a processor to execute program code, the intermediary service component to receive the message from the sender computing system and further to:

create a first digest based at least on an identifier of the message, the first authentication data, and a system secret;

process the message after the creation of the first digest;

after the processing of the message, create a new digest based at least on the identifier of the message, the first authentication data, and the system secret;

determine whether the first digest conforms to the new digest;

create, if it is determined that the first digest conforms to the new digest, a second assertion including the first authentication data, a second attester signature of the processed message and a second attester certificate, the second attester signature being a digital signature of a second attester different than the first attester;

transmit the second assertion and the processed message; and         prior to processing of the message, perform an authentication action based on the second authentication data, determine whether the attester signature is valid and determine whether the attester certificate is trusted; and     a receiver computing system to receive the second assertion and the processed message.

15. A system according to claim 14, the intermediary service component further to:

perform an authentication action based on the second authentication data; determine whether the attester signature is valid; and determine whether the attester certificate is trusted.

16. A system according to claim 14, wherein the first digest can be used to unambiguously prove a linkage between the first authentication data and the received message.

17. A system according to claim 14, wherein the intermediary component to determine whether the first digest conforms to the new digest comprises an intermediary element to determine whether the first digest matches the new digest.

\* \* \* \* \*